C. H. GOULD.

CARRIAGE-STEP.

No. 7,147. Reissued May 30, 1876.

WITNESSES

E. M. Gallaher.

Geo. W. Browne

By

INVENTOR

Charles H. Gould,

J. S. Brown, his Attorney

N. PETERS, PHOTO-LITHOGRAPHER, WASHINGTON, D. C.

UNITED STATES PATENT OFFICE.

CHARLES H. GOULD, OF BOSTON, MASSACHUSETTS.

IMPROVEMENT IN CARRIAGE-STEPS.

Specification forming part of Letters Patent No. 137,547, dated April 8, 1873; reissue No. 7,147, dated May 30, 1876; application filed February 29, 1876.

*To all whom it may concern:*

Be it known that I, CHARLES H. GOULD, of Boston, in the county of Suffolk and State of Massachusetts, have invented an Improved Elastic Shield for the Steps of Cars and Carriages; and I do hereby declare that the following is a full and exact description thereof, reference being had to the accompanying drawings, making part of this specification—

Figure 1:
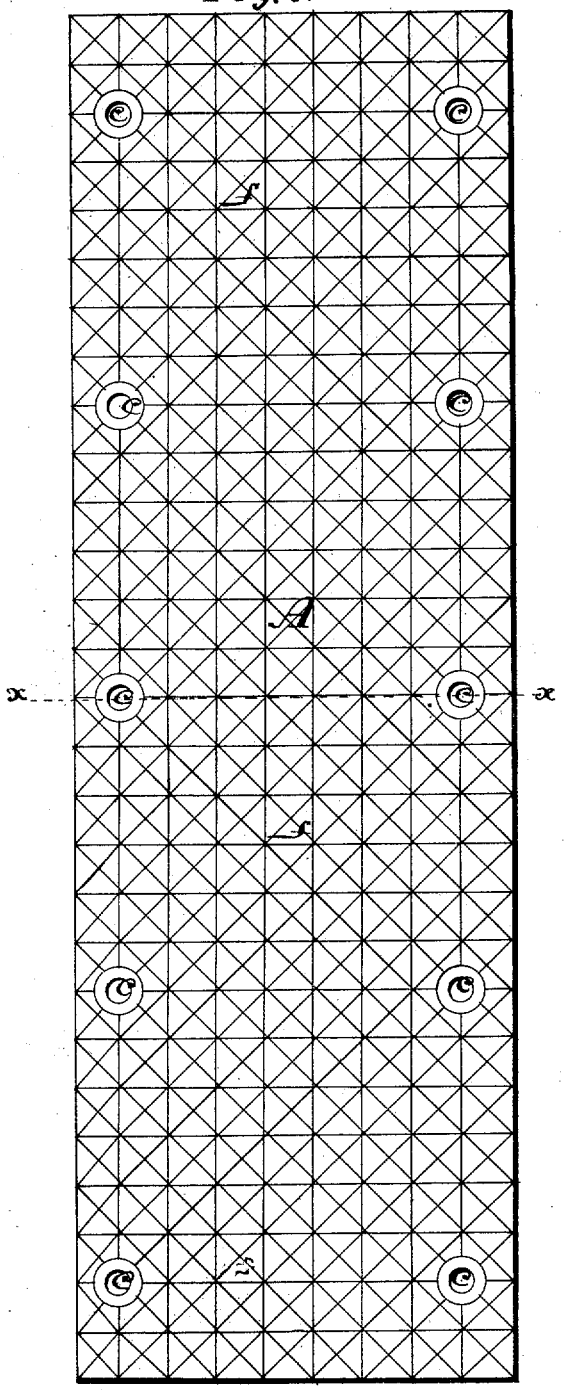
Figure 2:
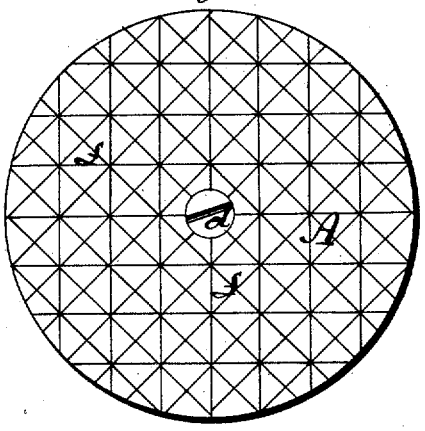
Figure 3:
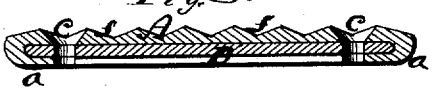
Figure 4:
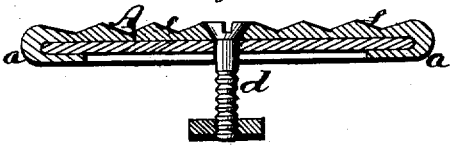

Figure 1 being a top view of one of my improved shields for railroad-car steps; Fig. 2, a top view of one of my improved shields for carriage-steps; Fig. 3, a transverse section of the car-step shield, in a plane indicated by the line *x x*, Fig. 1; Fig. 4, a central section of the carriage-step shield as shown in Fig. 2.

Like letters designate corresponding parts in all of the figures.

In the invention for which Letters Patent were granted to me September 20, 1870, the subject-matter of which being an improved shield for carriage-steps, the india-rubber or equivalent elastic shield fits over and around the edge or edges of a metallic disk or plate, so that, when the disk or plate is applied to the carriage-step, the edges of the shield come between the said disk or plate and the step, and thereby not only is the shield held securely, but it gives additional elasticity and softness to the step.

My present invention consists in the combination with the india-rubber, or equivalent elastic substance or composition which forms the upper or exposed surface of the shield, of a base or body of a flexible fibrous material, possessing sufficient firmness and thickness to form the foundation thereof and keep the shield in shape, and to secure it firmly to the step.

The principal advantages of this fibrous base over the metallic plate or disk for the purpose are, first, its flexibility and readiness of adaptation to the surface of the step, even if uneven or irregular, being at the same time sufficiently rigid and firm to keep the shield in shape and position on the step; second, its entire freedom from liability to cut through the shield at the edges, as the metallic plate is liable to do; third, its greater lightness; fourth, its greater cheapness; fifth, its greater durability; sixth, less of the elastic material is required; seventh, its freedom from liability to tear from the elastic material, and thus spoil the shield.

In the accompanying drawings, A represents the shield, of vulcanized india-rubber, or equivalent elastic substance or composition; and B, the body or back, of a flexible fibrous material, such as some heavy cloth or leather-board possessing the requisite properties of strength, tenacity, lightness, and sufficient firmness to keep the shield in shape and position.

The india-rubber may be molded and pressed upon or around the fibrous back and vulcanized while in the press.

Countersunk holes *c c* are molded or formed in the shield or disk or sheet, for receiving screws, bolts, or other means of fastening the shield to the step. Fastening bolts or screws are shown at *d d* in the drawings.

The shield is or may be covered with a water-proof varnish, which renders the under side of the shield impervious to water. The upper surface of the shield is or may be formed with projections, *f f*, or otherwise roughened, as an additional safeguard against slipping. This shield is also applicable to the steps of steamboats and buildings, especially in places exposed to rain, snow, or wetness in any way.

What I claim as my invention, and desire to secure by Letters Patent, is—

The combination of india-rubber or equivalent elastic shield top or surface A with a sheet or disk, B, of a fibrous material, forming a body or back to compose a flexible elastic shield for car, carriage, and other steps, substantially as and for the purpose herein specified.

Specification signed by me this 31st day of December, 1875.

CHARLES H. GOULD.

Witnesses:

JOHN ALLEN,
J. S. BROWN.